(12) United States Patent
Ryu et al.

(10) Patent No.: US 12,556,257 B2
(45) Date of Patent: Feb. 17, 2026

(54) USER EQUIPMENT TO USER EQUIPMENT BEAM MANAGEMENT

(71) Applicant: QUALCOMM Incorporated, San Diego, CA (US)

(72) Inventors: Jae Ho Ryu, San Diego, CA (US); Kazuki Takeda, Minato-ku (JP)

(73) Assignee: Qualcomm Incorporated, San Diego, CA (US)

( * ) Notice: Subject to any disclaimer, the term of this patent is extended or adjusted under 35 U.S.C. 154(b) by 44 days.

(21) Appl. No.: 18/410,665

(22) Filed: Jan. 11, 2024

(65) Prior Publication Data
US 2024/0333365 A1  Oct. 3, 2024

Related U.S. Application Data

(60) Provisional application No. 63/493,898, filed on Apr. 3, 2023.

(51) Int. Cl.
*H04B 7/06* (2006.01)
*H04B 7/0408* (2017.01)

(52) U.S. Cl.
CPC ....... *H04B 7/06952* (2023.05); *H04B 7/0408* (2013.01); *H04B 7/0626* (2013.01)

(58) Field of Classification Search
CPC ............ H04B 7/06952; H04B 7/04808; H04B 7/0626
See application file for complete search history.

(56) References Cited

U.S. PATENT DOCUMENTS

| | | | |
|---|---|---|---|
| 2019/0319686 A1* | 10/2019 | Chen, IV | H04B 7/0639 |
| 2021/0160850 A1* | 5/2021 | Akkarakaran | H04W 76/14 |
| 2021/0321266 A1* | 10/2021 | Raghavan | H04B 7/0617 |
| 2022/0046430 A1* | 2/2022 | Liu | H04B 7/0695 |
| 2022/0085852 A1* | 3/2022 | Elshafie | H04B 7/0478 |
| 2022/0345901 A1* | 10/2022 | Wang | H04W 16/28 |
| 2023/0318673 A1* | 10/2023 | Pezeshki | G01S 1/08 375/262 |
| 2023/0354385 A1* | 11/2023 | Oh | H04W 72/542 |
| 2023/0413089 A1* | 12/2023 | Wang | H04W 88/04 |
| 2024/0333365 A1* | 10/2024 | Ryu | H04B 7/06952 |

OTHER PUBLICATIONS

International Search Report and Written Opinion—PCT/US2024/019059—ISA/EPO—Jun. 17, 2024.

\* cited by examiner

*Primary Examiner* — Jaison Joseph
(74) *Attorney, Agent, or Firm* — Harrity & Harrity, LLP

(57) ABSTRACT

Various aspects of the present disclosure generally relate to wireless communication. In some aspects, a user equipment (UE) may transmit signaling regarding a UE-to-UE beam maintenance (BM) procedure supported by the UE. The UE may perform the UE-to-UE BM procedure based at least in part on the signaling. Numerous other aspects are described.

20 Claims, 11 Drawing Sheets

USER EQUIPMENT TO USER EQUIPMENT BEAM MANAGEMENT

CROSS-REFERENCE TO RELATED APPLICATION

This patent application claims priority to U.S. Provisional Patent Application No. 63/493,898, filed on Apr. 3, 2023, entitled "USER EQUIPMENT TO USER EQUIPMENT BEAM MANAGEMENT," and assigned to the assignee hereof. The disclosure of the prior Application is considered part of and is incorporated by reference into this patent application.

FIELD OF THE DISCLOSURE

Aspects of the present disclosure generally relate to wireless communication and to techniques and apparatuses for user equipment (UE) to UE (UE-to-UE) beam management.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include transmitting signaling regarding a UE-to-UE beam maintenance (BM) procedure supported by the UE. The method may include performing the UE-to-UE BM procedure based at least in part on the signaling.

Some aspects described herein relate to a UE for wireless communication. The UE may include a memory and one or more processors coupled to the memory. The one or more processors may be configured to transmit signaling regarding a UE-to-UE BM procedure supported by the UE. The one or more processors may be configured to perform the UE-to-UE BM procedure based at least in part on the signaling.

Some aspects described herein relate to a non-transitory computer-readable medium that stores a set of instructions for wireless communication by a UE. The set of instructions, when executed by one or more processors of the UE, may cause the UE to transmit signaling regarding a UE-to-UE BM procedure supported by the UE. The set of instructions, when executed by one or more processors of the UE, may cause the UE to perform the UE-to-UE BM procedure based at least in part on the signaling.

Some aspects described herein relate to an apparatus for wireless communication. The apparatus may include means for transmitting signaling regarding a UE-to-UE beam maintenance (BM) procedure supported by the apparatus. The apparatus may include means for performing the UE-to-UE BM procedure based at least in part on the signaling.

Aspects generally include a method, apparatus, system, computer program product, non-transitory computer-readable medium, user equipment, base station, network entity, network node, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
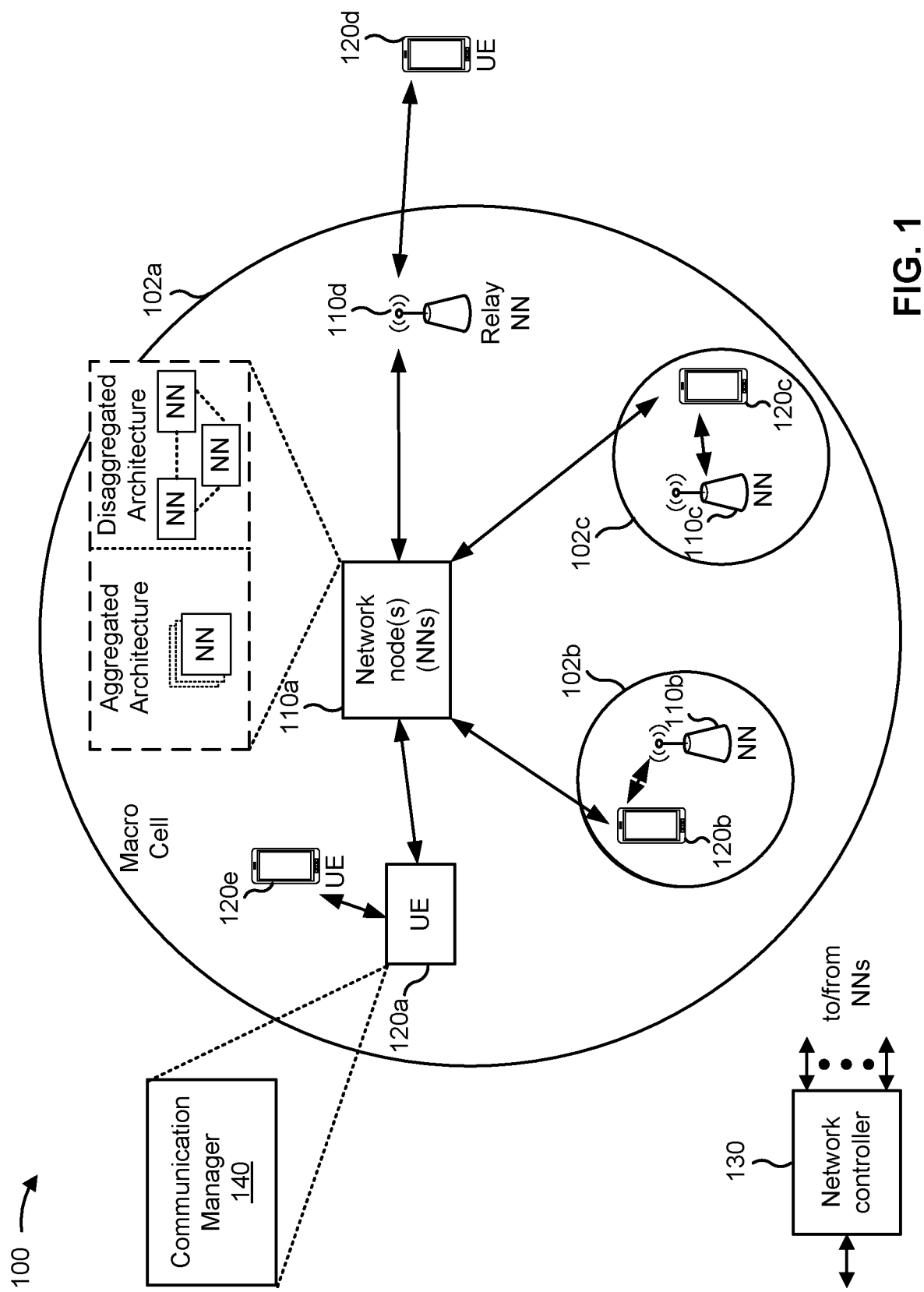
FIG. 1 is a diagram illustrating an example of a wireless network, in accordance with the present disclosure.

A wireless communication device such as a user equipment (UE) may use beamforming to communicate with other wireless communication devices, which improves signal propagation and counteracts the increased path loss of higher-frequency communication. For example, a UE may perform beamforming for transmission (in which a radiated signal is beamformed) and/or reception (in which a spatial filter is applied to a set of antennas to receive a radiated signal). In some deployments, a network node (such as a gNB) and a UE may use beamforming to communicate with one another. Beam selection and management (collectively referred to herein as beam maintenance) may enable the UE and the network node to identify an appropriate beam pair (comprising one or more transmit beams at a transmitter and one or more receive beams at a receiver) with which to communicate.

In some examples, two UEs may communicate with one another using beamforming. For example, UEs may use beamforming for sidelink unicast communication, such as in Frequency Range 2 (FR2) (e.g., mm Wave). However, procedures for beam maintenance may not be well defined for sidelink beamforming, which may lead to suboptimal beam selection when a UE changes location or orientation. Furthermore, in beamforming between a UE and a network node, it is generally expected that the network node is stationary and does not move or rotate. Therefore, beam maintenance procedures between a UE and a network node may be based on an assumption that a network node's beam direction does not change over time. For example, in some situations, an explicit beam maintenance procedure involving feedback between a transmitter and a receiver may introduce latency to beam maintenance. On the other hand, if a sidelink UE (such as a roadside unit) does not move or rotate, an explicit beam maintenance procedure may be more robust or stable than an implicit beam maintenance procedure.

Some techniques described herein provide UE-to-UE beam maintenance procedures. For example, some techniques described herein provide an implicit UE-to-UE beam maintenance procedure, in which a UE refines its own beam by measuring reference signaling, from a transmitting UE, on a single transmit beam (or a set of transmit beams) using multiple receive beams at the UE. Thus, latency is reduced relative to beam maintenance procedures between a UE and a network node, which facilitates beam maintenance between UEs in motion. As another example, some techniques described herein provide an explicit UE-to-UE beam maintenance procedure, in which a transmitting UE transmits reference signaling on multiple beams, receives feedback from a receiving UE regarding one or more beams of the multiple beams, and then transmits information indicating a selected beam. Thus, stability and robustness of beamforming are achieved, particularly in a situation in which one or both UEs are stationary.

In some examples, a UE may have a capability for (e.g., may support) one or more types of UE-to-UE beam maintenance, such as explicit beam maintenance or implicit beam maintenance. Explicit beam maintenance and implicit beam maintenance are described in more detail below. Different UEs may have different capabilities for beam maintenance, or may wish to activate or deactivate (e.g., support or stop supporting) a type of beam maintenance. Some techniques described herein provide signaling of capability information that indicates one or more types of UE-to-UE beam maintenance supported by a UE. Thus, two UEs can identify an appropriate type of UE-to-UE beam maintenance for a beam pair of the two UEs, which improves conformity with capabilities of UEs and increases flexibility of beamforming. Furthermore, in some examples, a type of UE-to-UE beam maintenance used by UEs may switch, based at least in part on a motion state of the UEs, which provides stability and robustness for stationary UEs (such as by using explicit UE-to-UE beam maintenance) or reduced latency for UEs in motion (such as by using implicit UE-to-UE beam maintenance).

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a UE 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (Dus), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more Cus, and/or one or more Dus. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120c) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHZ). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHZ-71 GHz), FR4 (52.6 GHz-114.25 GHZ), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHZ, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may transmit signaling regarding a UE-to-UE BM procedure supported by the UE; and perform the UE-to-UE BM procedure based at least in part on the signaling. Additionally, or alternatively, the communication manager 140 may perform one or more other operations described herein.

As indicated above, FIG. 1 is provided as an example. Other examples may differ from what is described with regard to FIG. 1.

Figure 2:
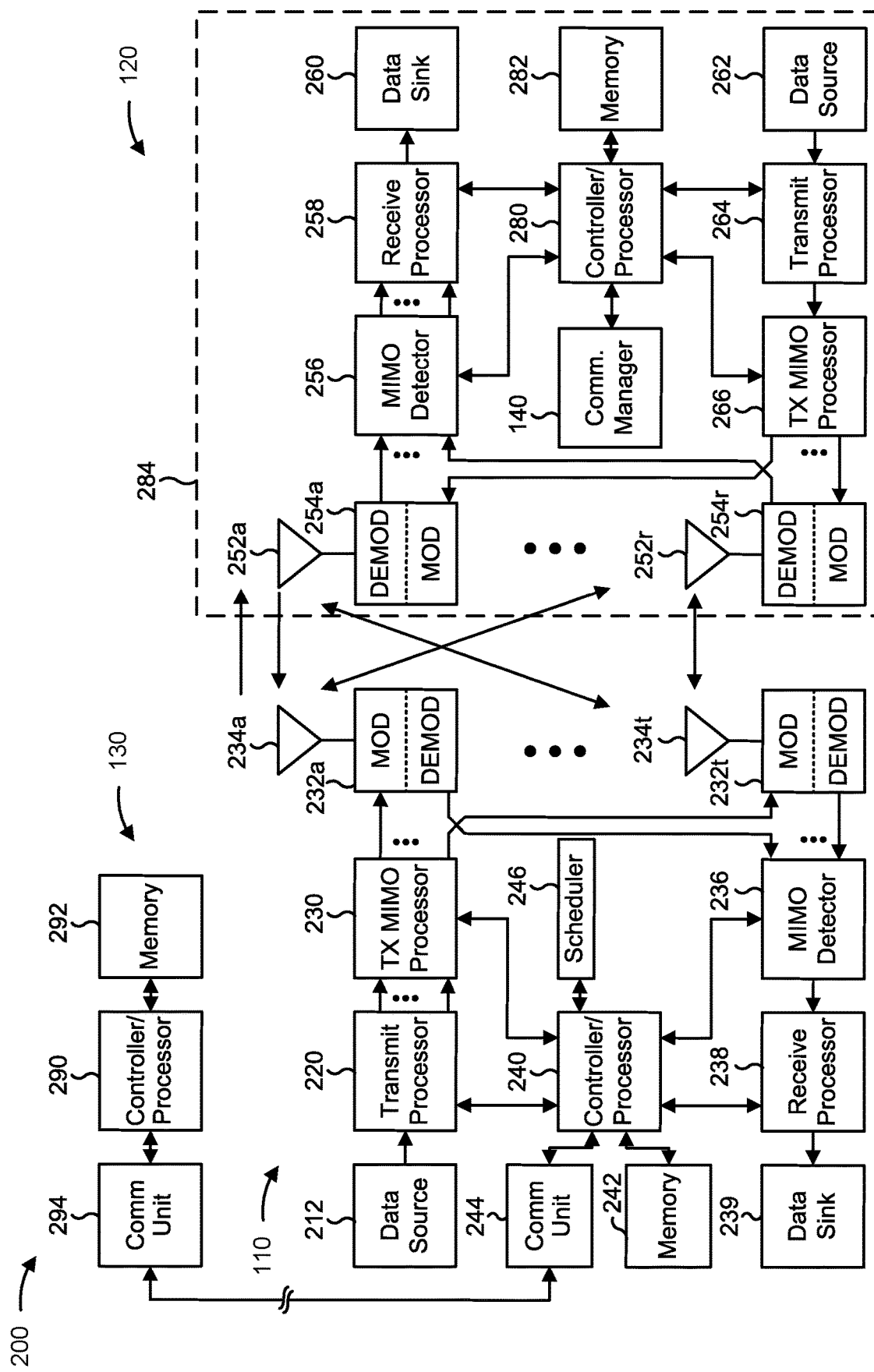
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more Cus, or one or more Dus.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-11).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-11).

The controller/processor 240 of the network node 110, the controller/processor 280 of the UE 120, and/or any other component(s) of FIG. 2 may perform one or more techniques associated with UE-to-UE BM, as described in more detail elsewhere herein. For example, the controller/processor 240 of the network node 110, the controller/processor 280 of the UE 120, and/or any other component(s) of FIG. 2 may perform or direct operations of, for example, process 1000 of FIG. 10, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 1000 of FIG. 10, and/or other processes as described herein. In some examples, executing instructions may include running the instructions, converting the instructions, compiling the instructions, and/or interpreting the instructions, among other examples.

In some aspects, the UE 120 includes means for transmitting signaling regarding a UE-to-UE BM procedure supported by the UE; and/or means for performing the UE-to-UE BM procedure based at least in part on the signaling. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (CNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more Cus, one or more Dus, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more Cus, one or more Dus, or one or more RUs). In some examples, a CU may be implemented within a network node, and one or more Dus may be co-located with the CU, or alternatively, may be geographically or virtually distributed throughout one or multiple other network nodes. The Dus may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
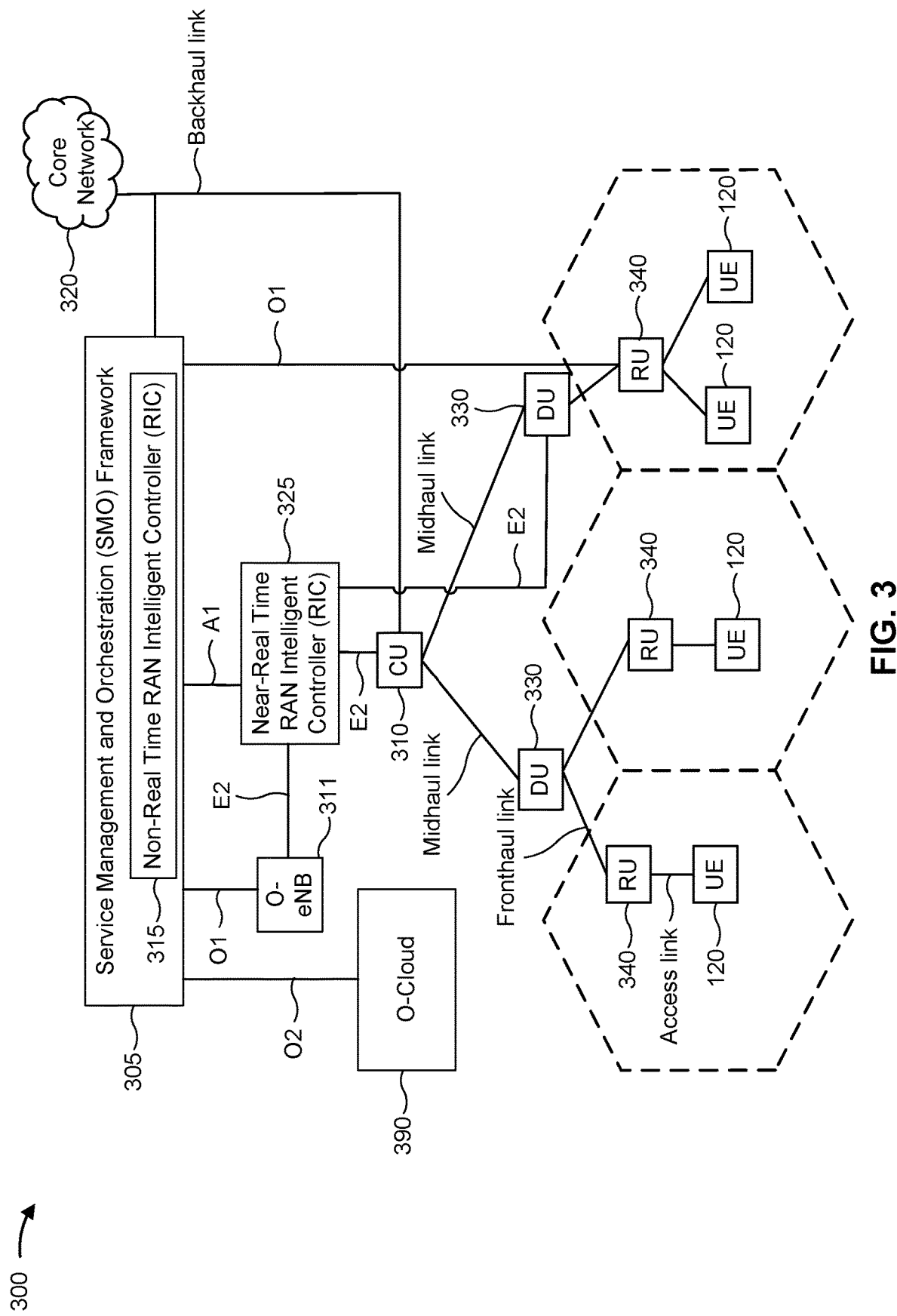
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more Dus 330 via respective midhaul links, such as through F1 interfaces. Each of the Dus 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the Cus 310, the Dus 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (IFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, Cus 310, Dus 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more Cus 310, one or more Dus 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
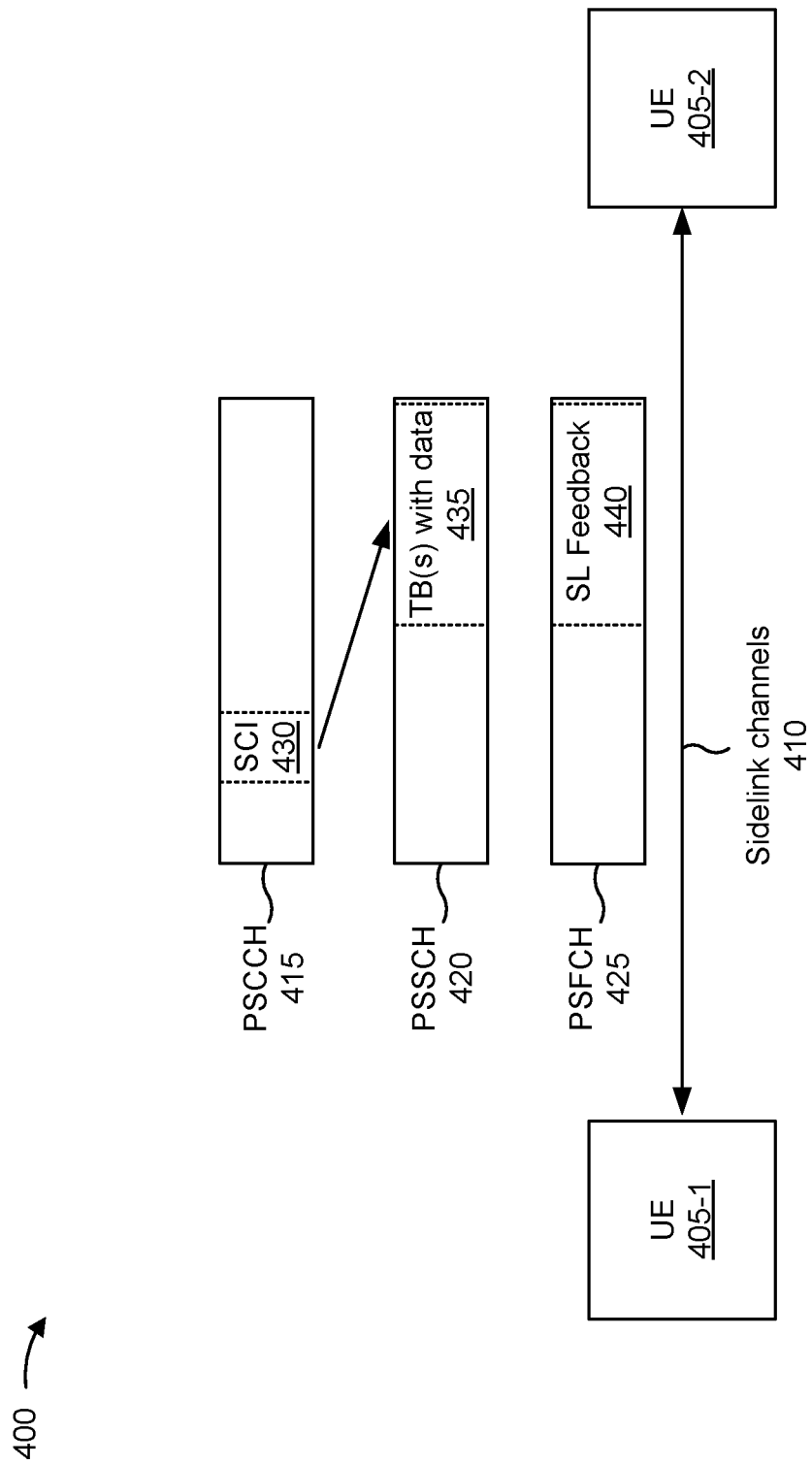
FIG. 4 is a diagram illustrating an example of sidelink communications, in accordance with the present disclosure.

FIG. 4 is a diagram illustrating an example 400 of sidelink communications, in accordance with the present disclosure.

As shown in FIG. 4, a first UE 405-1 may communicate with a second UE 405-2 (and one or more other UEs 405) via one or more sidelink channels 410. The UEs 405-1 and 405-2 may communicate using the one or more sidelink channels 410 for P2P communications, D2D communications, V2X communications (e.g., which may include V2V communications, V2I communications, and/or V2P communications) and/or mesh networking. In some aspects, the UEs 405 (e.g., UE 405-1 and/or UE 405-2) may correspond to one or more other UEs described elsewhere herein, such as UE 120. In some aspects, the one or more sidelink channels 410 may use a PC5 interface and/or may operate in a high frequency band (e.g., the 5.9 GHz band). Additionally, or alternatively, the UEs 405 may synchronize timing of transmission time intervals (TTIs) (e.g., frames, subframes, slots, or symbols) using global navigation satellite system (GNSS) timing.

As further shown in FIG. 4, the one or more sidelink channels 410 may include a physical sidelink control channel (PSCCH) 415, a physical sidelink shared channel (PSSCH) 420, and/or a physical sidelink feedback channel (PSFCH) 425. The PSCCH 415 may be used to communicate control information, similar to a physical downlink control channel (PDCCH) and/or a physical uplink control channel (PUCCH) used for cellular communications with a network node 110 via an access link or an access channel. The PSSCH 420 may be used to communicate data, similar to a physical downlink shared channel (PDSCH) and/or a physical uplink shared channel (PUSCH) used for cellular communications with a network node 110 via an access link or an access channel. For example, the PSCCH 415 may carry sidelink control information (SCI) 430, which may indicate various control information used for sidelink communications, such as one or more resources (e.g., time resources, frequency resources, and/or spatial resources) where a transport block (TB) 435 may be carried on the PSSCH 420. The TB 435 may include data. The PSFCH 425 may be used to communicate sidelink feedback 440, such as hybrid automatic repeat request (HARQ) feedback (e.g., acknowledgement or negative acknowledgement (ACK/NACK) information), transmit power control (TPC), and/or a scheduling request (SR).

Although shown on the PSCCH 415, in some aspects, the SCI 430 may include multiple communications in different stages, such as a first stage SCI (SCI-1) and a second stage SCI (SCI-2). The SCI-1 may be transmitted on the PSCCH 415. The SCI-2 may be transmitted on the PSSCH 420. The SCI-1 may include, for example, an indication of one or more resources (e.g., time resources, frequency resources, and/or spatial resources) on the PSSCH 420, information for decoding sidelink communications on the PSSCH, a quality of service (QOS) priority value, a resource reservation period, a PSSCH demodulation reference signal (DMRS) pattern, an SCI format for the SCI-2, a beta offset for the SCI-2, a quantity of PSSCH DMRS ports, and/or a modulation and coding scheme (MCS). The SCI-2 may include information associated with data transmissions on the PSSCH 420, such as a HARQ process ID, a new data indicator (NDI), a source identifier, a destination identifier, and/or a channel state information (CSI) report trigger.

In some aspects, the one or more sidelink channels 410 may use resource pools. For example, a scheduling assignment (e.g., included in SCI 430) may be transmitted in sub-channels using specific resource blocks (RBs) across time. In some aspects, data transmissions (e.g., on the PSSCH 420) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 405 may operate using a sidelink transmission mode (e.g., Mode 1) where resource selection and/or scheduling is performed by a network node 110 (e.g., a base station, a CU, or a DU). For example, the UE 405 may receive a grant (e.g., in downlink control information (DCI) or in a radio resource control (RRC) message, such as for configured grants) from the network node 110 (e.g., directly or via one or more network nodes) for sidelink channel access and/or scheduling. In some aspects, a UE 405 may operate using a transmission mode (e.g., Mode 2) where resource selection and/or scheduling is performed by the UE 405 (e.g., rather than a network node 110). In some aspects, the UE 405 may perform resource selection and/or scheduling by sensing channel availability for transmissions. For example, the UE 405 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, and/or may measure a reference signal received quality (RSRQ) parameter (e.g., a PSSCH-RSRQ parameter) associated with various sidelink channels, and may select a channel for transmission of a sidelink communication based at least in part on the measurement(s).

Additionally, or alternatively, the UE 405 may perform resource selection and/or scheduling using SCI 430 received in the PSCCH 415, which may indicate occupied resources and/or channel parameters. Additionally, or alternatively, the UE 405 may perform resource selection and/or scheduling by determining a channel busy ratio (CBR) associated with various sidelink channels, which may be used for rate control (e.g., by indicating a maximum number of resource blocks that the UE 405 can use for a particular set of subframes).

In the transmission mode where resource selection and/or scheduling is performed by a UE 405, the UE 405 may generate sidelink grants, and may transmit the grants in SCI 430. A sidelink grant may indicate, for example, one or more parameters (e.g., transmission parameters) to be used for an upcoming sidelink transmission, such as one or more resource blocks to be used for the upcoming sidelink transmission on the PSSCH 420 (e.g., for TBs 435), one or more subframes to be used for the upcoming sidelink transmission, and/or a modulation and coding scheme (MCS) to be used for the upcoming sidelink transmission. In some aspects, a UE 405 may generate a sidelink grant that indicates one or more parameters for semi-persistent scheduling (SPS), such as a periodicity of a sidelink transmission. Additionally, or alternatively, the UE 405 may generate a sidelink grant for event-driven scheduling, such as for an on-demand sidelink message.

As indicated above, FIG. 4 is provided as an example. Other examples may differ from what is described with respect to FIG. 4.

Figure 5:
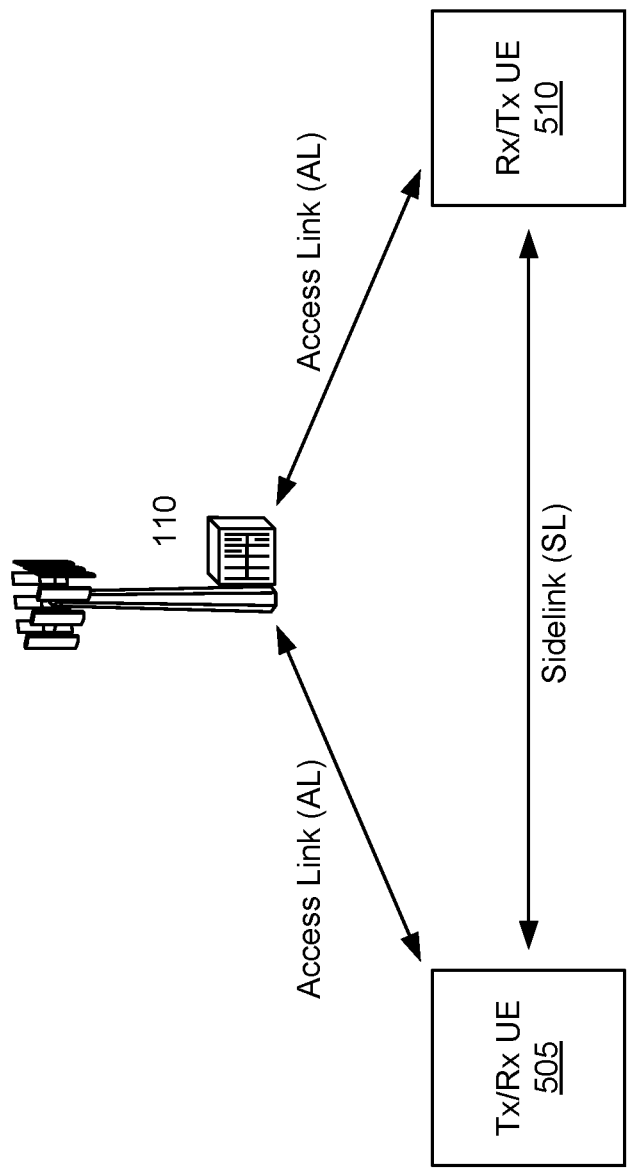
FIG. 5 is a diagram illustrating an example of sidelink communications and access link communications, in accordance with the present disclosure.

FIG. 5 is a diagram illustrating an example 500 of sidelink communications and access link communications, in accordance with the present disclosure.

As shown in FIG. 5, a transmitter (Tx)/receiver (Rx) UE 505 and an Rx/Tx UE 510 may communicate with one another via a sidelink, as described above in connection with FIG. 4. As further shown, in some sidelink modes, a network node 110 may communicate with the Tx/Rx UE 505 (e.g., directly or via one or more network nodes), such as via a first access link. Additionally, or alternatively, in some sidelink modes, the network node 110 may communicate with the Rx/Tx UE 510 (e.g., directly or via one or more network nodes), such as via a first access link. The Tx/Rx UE 505 and/or the Rx/Tx UE 510 may correspond to one or more UEs described elsewhere herein, such as the UE 120 of FIG. 1. Thus, a direct link between UEs 120 (e.g., via a PC5 interface) may be referred to as a sidelink, and a direct link between a network node 110 and a UE 120 (e.g., via a Uu interface) may be referred to as an access link. Sidelink communications may be transmitted via the sidelink, and access link communications may be transmitted via the access link. An access link communication may be either a downlink communication (from a network node 110 to a UE 120) or an uplink communication (from a UE 120 to a network node 110).

As indicated above, FIG. 5 is provided as an example. Other examples may differ from what is described with respect to FIG. 5.

Figure 6:
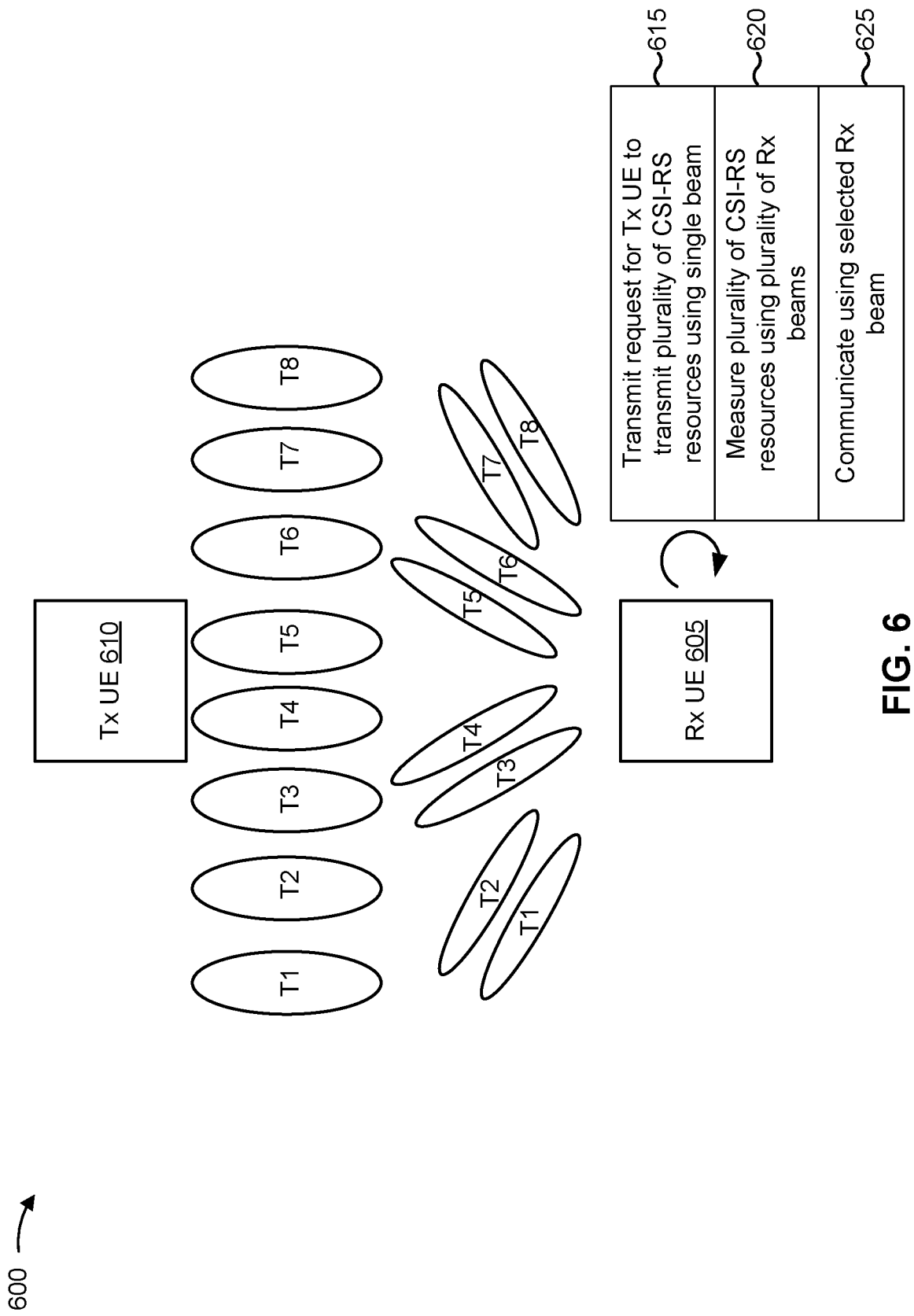
FIG. 6 is a diagram illustrating an example of an implicit UE-to-UE beam maintenance (BM) procedure, in accordance with the present disclosure.

FIG. 6 is a diagram illustrating an example 600 of an implicit UE-to-UE beam maintenance (BM) procedure, in accordance with the present disclosure. Generally, an implicit UE-to-UE BM procedure is a procedure in which a receiving (Rx) UE 605 (e.g., UE 120, UE 405, UE 505) performs a plurality of measurements to refine a receive beam (and optionally a transmit beam, if beam correspondence is enabled at the Rx UE 605) of the Rx UE 605. For example, in some aspects, an implicit UE-to-UE BM procedure may involve no feedback signaling from the Rx UE 605 to the transmitting UE 610. The implicit UE-to-UE BM procedure may be referred to as receiver-autonomous beam refinement. Example 600 also includes a transmitting (Tx) UE 610 (e.g., UE 120, UE 405, UE 505). In some aspects, the Rx UE 605 and the Tx UE 610 may communicate in FR2. Beam correspondence is a feature by which a UE can derive beam parameters of one beam (e.g., a transmit beam or a receive beam at the UE) from beam parameters of a reciprocal beam (e.g., a receive beam or a transmit beam, respectively).

Example 600 illustrates a plurality of transmissions by the Tx UE 610 and a plurality of receptions (e.g., measurements) by the Rx UE 605. Each transmission by the Tx UE 610 may utilize a reference signal (RS) resource. For example, each transmission by the Tx UE 610 may utilize a channel state information (CSI) RS (CSI-RS) resource. A CSI-RS resource may define a time, a frequency, and/or parameters (e.g., beam parameters, such as a quasi co-location (QCL) parameter or a transmission configuration indicator (TCI) state) with which the Tx UE 610 is to transmit a CSI-RS. The Tx UE 610 may transmit a CSI-RS resource, meaning that the Tx UE 610 may transmit a CSI-RS according to a corresponding CSI-RS resource. The Rx UE 605 may perform a measurement according to a CSI-RS resource (e.g., at a time and/or frequency defined by the CSI-RS resource and/or using a parameter indicated by the CSI-RS resource), which is referred to herein as measuring a CSI-RS resource. The measurement may include any suitable measurement, such as a reference signal received power (RSRP) measurement, a reference signal received quality (RSRQ) measurement, a signal-to-interference-plus-noise ratio (SINR) measurement, or the like. The measurement may be referred to as a Layer 1 measurement (as compared to a filtered measurement which may incorporate time-domain filtering, such as a Layer 3 measurement). Each CSI-RS resource transmission and reception is shown with an indicator T1 through T8. For example, T1 indicates that the transmission and reception occur at a time T1. Thus, it can be seen that the Tx UE 610 transmits multiple CSI-RS resources with a fixed beam (referred to as beam repetition). For example, the multiple CSI-RS resources may belong to a same resource set. It can also be seen that the Rx UE 605 measures the multiple CSI-RS resources using beam sweeping, in which a receive beam of the Rx UE 605 changes receive beams from one measurement to another. For example, beam sweeping may involve measurements using multiple different beams within a resource set.

As shown by reference number 615, in some aspects, the Rx UE 605 may transmit, and the Tx UE 610 may receive, a request for the Tx UE 610 to transmit the plurality of CSI-RS resources. For example, the request may indicate for the Tx UE 610 to transmit the plurality of CSI-RS resources using a fixed beam (e.g., using beam repetition). In some aspects, the request may be aperiodic. For example, the Rx UE 605 may transmit an aperiodic request, that is not associated with a periodicity, to trigger the Tx UE 610 to transmit the plurality of CSI-RS resources. In some other aspects, the request may be periodic. For example, the Rx UE 605 may transmit the request in accordance with a periodicity, such as on a configured resource or in accordance with a configured parameter indicating the periodicity.

As shown by reference number 620, the Rx UE 605 may measure the plurality of CSI-RS resources using a plurality of receive beams (in example 600, four different receive beams). The measurements are described above. Thus, the Rx UE 605 may measure the plurality of CSI-RS resources using beam sweeping, which may enable refinement of the Rx UE 605's receive beam.

As shown by reference number 625, the Rx UE 605 may communicate with the Tx UE 610 using a selected receive beam. For example, the Rx UE 605 may select the selected receive beam from the plurality of receive beams with which the Rx UE 605 measured the plurality of CSI-RS resources. In some aspects, the selected receive beam may have a best measurement value (e.g., a strongest RSRP, a strongest RSRQ, a highest SINR) of the plurality of receive beams. In some aspects, communicating with the Tx UE 610 using the selected receive beam may include receiving a communication from the Tx UE 610 using the selected receive beam. Additionally, or alternatively, communicating with the Tx UE 610 using the selected receive beam may include transmitting a communication to the Tx UE 610 using the selected receive beam. For example, if the Rx UE 605 supports beam correspondence, the Rx UE 605 may use the selected receive beam (e.g., spatial parameters of the selected receive beam such as a QCL parameter or a TCI state) to transmit a communication to the Tx UE 610. Thus, the Rx UE 605 can select or refine a receive beam for transmission or reception without performing feedback to the Tx UE 610, which reduces latency and overhead associated with beam refinement.

In some aspects, the Tx UE 610 may also perform the implicit UE-to-UE BM procedure in example 600. For example, the Tx UE 610 may perform one or more of the operations of example 600 described as performed by the Rx UE 605, and the Rx UE 605 may perform one or more of the operations of example 600 described as performed by the Tx UE 610.

Figure 7:
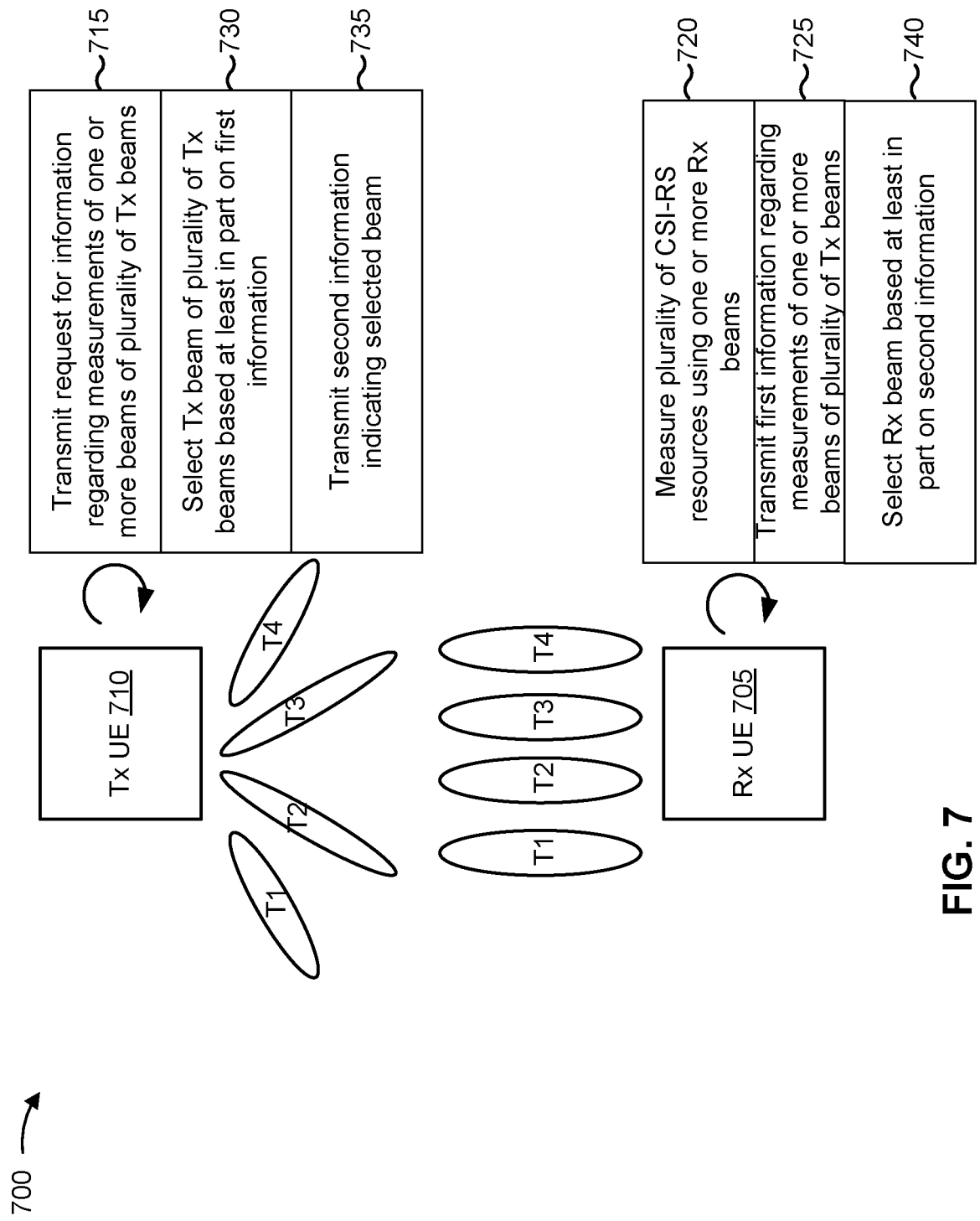
FIG. 7 is a diagram illustrating an example of an explicit UE-to-UE BM procedure, in accordance with the present disclosure.
Figure 8:
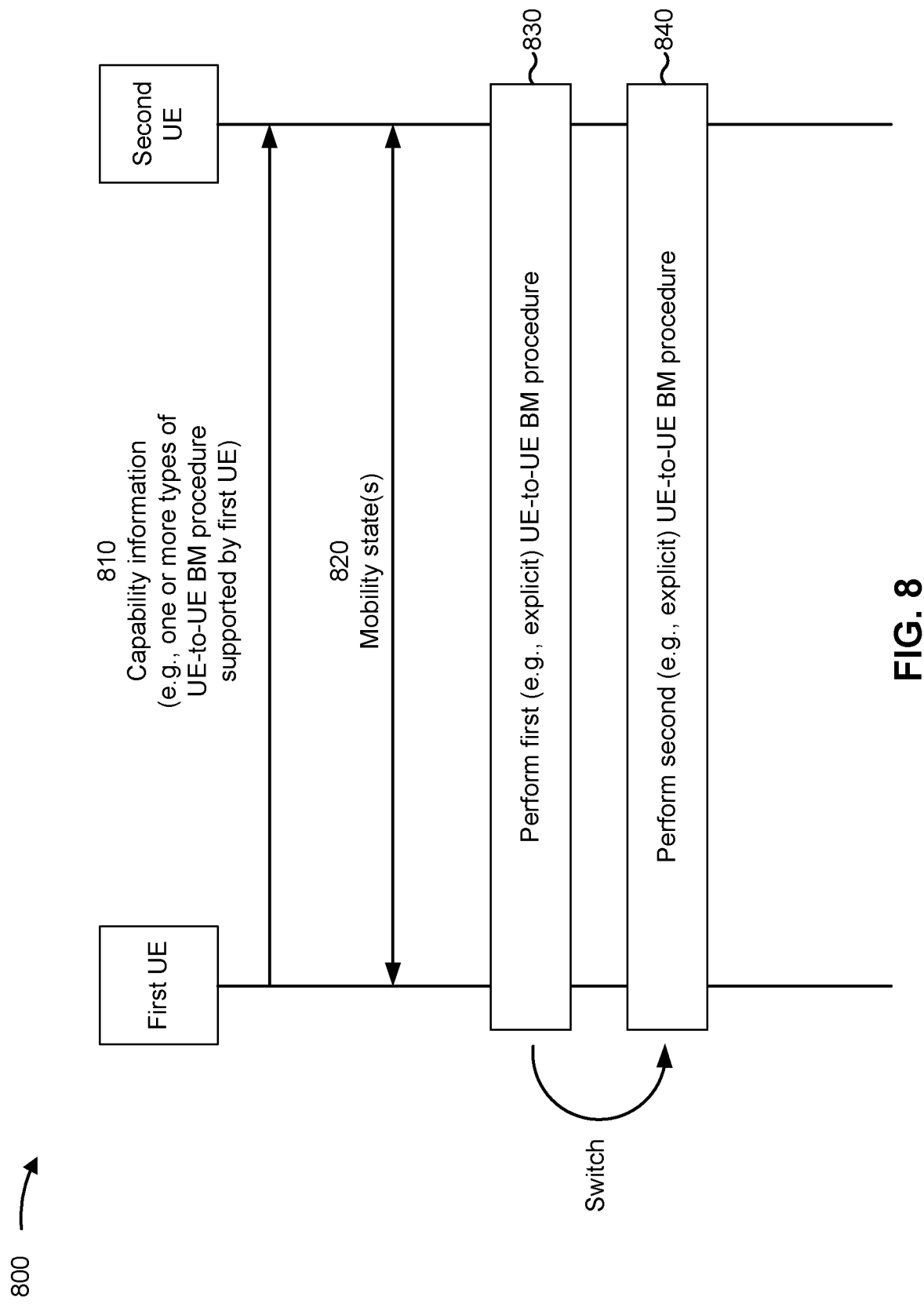
FIG. 8 is a diagram illustrating an example of signaling relating to UE-to-UE BM procedures, in accordance with the present disclosure.

In some aspects, the Tx UE 610 and the Rx UE 605 may exchange signaling as described, for example, in connection with example 800 of FIG. 8. Additionally, or alternatively, in addition to the operations described with regard to example 600, the Tx UE 610 and the Rx UE 605 may perform one or more explicit UE-to-UE BM operations, such as one or more of the operations described with regard to example 700 of FIG. 7.

As indicated above, FIG. 6 is provided as an example. Other examples may differ from what is described with regard to FIG. 6.

FIG. 7 is a diagram illustrating an example 700 of an explicit UE-to-UE BM procedure, in accordance with the present disclosure. Generally, an explicit UE-to-UE BM procedure is a procedure in which an Rx UE 705 (e.g., UE 120, UE 405, UE 505) provides feedback to a Tx UE 710 (e.g., UE 120, UE 405, UE 505) regarding RS resource transmissions by the Tx UE 710, such that the Tx UE 710 can select an appropriate Tx beam and/or report the selected Tx beam to the Rx UE 705. In some aspects, the Rx UE 705 and the Tx UE 710 may communicate in FR2.

Example 700 illustrates a plurality of RS transmissions by the Tx UE 710 Example 700 also includes a plurality of receptions (e.g., measurements) by the Rx UE 705. Each transmission by the Tx UE 710 may utilize an RS resource. For example, each transmission by the Tx UE 710 may utilize a CSI-RS resource. The Tx UE 710 may transmit a CSI-RS resource, meaning that the Tx UE 710 may transmit a CSI-RS according to a corresponding CSI-RS resource. The Rx UE 705 may perform a measurement according to a CSI-RS resource (e.g., at a time and/or frequency defined by the CSI-RS resource and/or using a parameter indicated by the CSI-RS resource), which is referred to herein as measuring a CSI-RS resource. The measurement may include any suitable measurement, such as an RSRP measurement, an RSRQ measurement, an SINR measurement, or the like. The measurement may be referred to as a Layer 1 measurement (as compared to a filtered measurement which may incorporate time-domain filtering, such as a Layer 3 measurement).

It can be seen that the Tx UE 710 transmits multiple CSI-RS resources with multiple beams (that is, using beam sweeping across a plurality of transmit beams). For example, the multiple CSI-RS resources may belong to a same resource set. The Rx UE 705 measures the multiple CSI-RS resources using one or more beams. For example, the Rx UE 705 may measure a first set of CSI-RS resources using a first receive beam and a second set of CSI-RS resources using a second receive beam. As another example, the Rx UE 705 may measure all of the CSI-RS resources using a same beam.

As shown by reference number 715, in some aspects, the Tx UE 710 may transmit, and the Rx UE 705 may receive, a request for information regarding measurements of one or more beams of the plurality of Tx beams. For example, the Tx UE 710 may trigger explicit UE-to-UE BM by transmitting the request. The request may be referred to as a trigger for Layer 1 RSRP (L1-RSRP) or Layer 1 SINR (L1-SINR) reporting from the Rx UE 705. For example, the request may indicate for the Rx UE 705 to transmit information regarding measurements of one or more beams of the plurality of Tx beams, wherein the information includes one or more L1-SINR or L1-RSRP measurements. The request can be transmitted periodically (such as in accordance with a configured resource or a configured periodicity parameter) or aperiodically. In some aspects, the request may comprise a field in a sidelink control information (SCI) message, such as SCI-2.

As shown by reference number 720, the Rx UE 705 may measure the plurality of CSI-RS resources using one or more Rx beams. In example 700, the Rx UE 705 uses a single Rx beam. In some aspects, the Rx UE may use a plurality of Rx beams. The measurements may include L1-RSRP measurements, L1-SINR measurements, or another form of measurements.

As shown by reference number 725, the Rx UE 705 may transmit, and the Tx UE 710 may receive, first information. The first information may include information regarding measurements of one or more Tx beams of the plurality of Tx beams. For example, the one or more Tx beams may include K beams, where K may be configurable or signaled by the Tx UE 705 or the Rx UE 710. In some aspects, the first information may relate to a top K beams, such as a set of K beams having a strongest L1-RSRP or a highest L1-SINR of the plurality of Tx beams. In some aspects, the first information may identify the one or more Tx beams, such as by using identifiers corresponding to CSI-RS resources of the one or more Tx beams. In some aspects, the Rx UE 705 may select the one or more Tx beams, for example, according to L1-RSRP or L1-SINR measurements of the one or more Tx beams or the plurality of Tx beams.

As shown by reference number 730, the Tx UE 710 may select a Tx beam, of the plurality of Tx beams. For example, the Tx UE 710 may select a Tx beam having a best measurement of the plurality of Tx beams. Thus, the Tx UE 710 may select the Tx beam based at least in part on the first information.

As shown by reference number 735, the Tx UE 710 may transmit, and the Rx UE 705 may receive, second information indicating the selected Tx beam. For example, the second information may indicate a TCI state of the selected Tx beam. The TCI state may indicate beam parameters (e.g., QCL parameters) of the selected Tx beam. In some aspects, the second information may indicate an identifier of a CSI-RS resource corresponding to the selected beam (e.g., the CSI-RS resource on which the RS measured by the Rx UE 705 was measured). In some aspects, the Tx UE 710 may communicate with the Rx UE 705 using the selected Tx beam (such as by transmitting a communication, which may include the second information, to the Rx UE 705 using the selected beam). In some aspects, the Tx UE 710 may determine an Rx beam corresponding to the selected Tx beam. For example, if the Tx UE 710 supports beam correspondence, the Tx UE 710 may use the selected Tx beam (e.g., spatial parameters of the selected Tx beam, such as a QCL parameter or a TCI state) to receive a communication from the Rx UE 705, which may be referred to as communicating with the Rx UE 705 using the selected Tx beam.

As shown by reference number 740, the Rx UE 705 may select an Rx beam. For example, the Rx UE 705 may select the Rx beam based at least in part on the second information. In some aspects, the Rx UE 705 may select an Rx beam that corresponds to the selected Tx beam indicated by the second information. For example, the Rx UE 705 may select an Rx beam that was used to measure the selected Tx beam. As another example, the Rx UE 705 may select a beam that corresponds to the selected Tx beam according to spatial parameters of the selected Tx bam. The Rx UE 705 may communicate with the Tx UE 710 using the selected Rx beam. For example, the Rx UE 705 may receive a communication from the Tx UE 710 using the selected beam. As another example, if the Rx UE 710 supports beam correspondence, the Rx UE 705 may use the selected Rx beam (e.g., spatial parameters of the selected Rx beam such as a QCL parameter or a TCI state) to transmit a communication to the Tx UE 710, which may be referred to as communicating with the Tx UE 710 using the selected Rx beam.

In some aspects, the Tx UE 710 and the Rx UE 705 may exchange signaling as described, for example, in connection with example 800 of FIG. 8. Additionally, or alternatively, in addition to the operations described with regard to example 700, the Tx UE 710 and the Rx UE 705 may perform one or more implicit UE-to-UE BM operations, such as one or more of the operations described with regard to example 600 of FIG. 6.

As indicated above, FIG. 7 is provided as an example. Other examples may differ from what is described with regard to FIG. 7.

FIG. 8 is a diagram illustrating an example 800 of signaling relating to UE-to-UE BM procedures, in accordance with the present disclosure. Example 800 includes a first UE (e.g., UE 120, UE 405, UE 505, UE 605, UE 610, UE 705, UE 710) and a second UE (e.g., UE 120, UE 405, UE 505, UE 605, UE 610, UE 705, UE 710). In some aspects, the first UE may be a Tx UE and the second UE may be an Rx UE. In some other aspects, the first UE may be an Rx UE and the second UE may be a Tx UE. In some aspects, the first UE and the second UE may communicate in FR2, such as using sidelink signaling.

As shown by reference number 810, the first UE may transmit, and the second UE may receive, capability information. The transmission of the capability information may be referred to herein as signaling regarding a UE-to-UE BM procedure. In some aspects, the second UE may transmit, and the first UE may receive, the capability information. For example, the first UE and the second UE may exchange capability information. In some aspects, the first UE and/or the second UE may transmit the capability information during unicast link establishment between the first UE and the second UE. For example, configuration information exchanged between the first UE and the second UE may include the capability information. In some aspects, the first UE and/or the second UE may transmit the capability information after unicast link establishment. For example, the first UE and/or the second UE may transmit the capability information via a unicast link between the first UE and the second UE (e.g., using a source identifier of a source UE of the capability information and a destination identifier of a destination UE of the capability information).

The capability information may indicate one or more types of UE-to-UE BM procedures supported by the first UE. For example, the capability information may indicate whether the first UE supports an implicit UE-to-UE BM procedure (as described with regard to FIG. 6). As another example, the capability information may indicate whether the first UE supports an explicit UE-to-UE BM procedure (as described with regard to FIG. 7). As another example, the capability information may indicate whether the first UE supports both an explicit UE-to-UE BM procedure and an implicit UE-to-UE BM procedure.

As shown by reference number 820, in some aspects, the second UE may transmit, and the first UE may receive, information indicating a mobility state of the second UE. Additionally, or alternatively, the first UE may transmit, and the second UE may receive, information indicating a mobility state of the first UE. In some aspects, a mobility state may indicate whether a UE is expected to move or change orientation. Additionally, or alternatively, a mobility state may indicate whether a UE is currently in motion or rotation. Additionally, or alternatively, a mobility state may indicate a type of UE (for example, the mobility state may indicate whether the UE is a fixed sidelink UE such as a sidelink relay UE, a roadside unit, or a sidelink hub UE, whether the UE is affixed to a stationary object or a moving object such as a vehicle, or whether the UE is a smartphone or other type of UE that is expected to move or change orientation). In some aspects, capability information may be based at least in part on a mobility state. Additionally, or alternatively, capability information may be based at least in part on whether a UE supports beam correspondence. For example, a mobile UE that supports beam correspondence may transmit information indicating that the mobile UE supports only implicit UE-to-UE BM procedures. In some aspects, a UE may determine its own mobility state using a mobility sensor or mobility measurement (e.g., if the mobility sensor or the mobility threshold indicates at least a threshold level of movement, the UE may determine that the UE is a mobile UE). Additionally, or alternatively, a UE may determine its own mobility state based at least in part on a configuration, such as a pre-configuration of the UE. The first UE and/or the second UE may use the information indicating the mobility state(s) to select a type of UE-to-UE BM procedure, as described below.

As shown by reference number 830, the first UE and the second UE may perform an explicit UE-to-UE BM procedure. For example, the first UE and the second UE may perform the explicit UE-to-UE BM procedure described with regard to FIG. 7. In some aspects, the first UE or the second UE may select the explicit UE-to-UE BM procedure. For example, the first UE or the second UE may select the explicit UE-to-UE BM procedure if the first UE and the second UE both support the explicit UE-to-UE BM procedure. As another example, the first UE or the second UE may select the explicit UE-to-UE BM procedure if a motion state of the first UE or the second UE indicates that the first UE or the second UE is stationary (or is associated with lower than a threshold level of movement). In some aspects, the first UE may transmit, and the second UE may receive, information indicating to perform the explicit UE-to-UE BM procedure, such as a request relating to the explicit UE-to-UE BM procedure, as described in connection with FIG. 7.

As shown by reference number 840, the first UE and the second UE may perform an implicit UE-to-UE BM procedure. Thus, the first UE and the second UE may switch from the explicit UE-to-UE BM procedure to the implicit UE-to-UE BM procedure. In some aspects, the first UE or the second UE may switch the type of UE-to-UE BM procedure based at least in part on a motion state. For example, a UE (e.g., the first UE or the second UE) may determine that a motion state of the UE or another UE (e.g., the second UE or the first UE) has changed, such as based at least in part on signaling from the other UE. The UE may switch the type of UE-to-UE BM procedure in accordance with the change of the motion state. For example, if a UE moves from a stationary motion state to a moving motion state, the UE may switch from the explicit UE-to-UE BM procedure to the implicit UE-to-UE BM procedure. In some aspects, if channel quality drops below a threshold, the UE may switch to the implicit UE-to-UE BM procedure, which may reduce the occurrence of missed communications relating to BM due to bad channel quality.

When the first UE supports both the implicit UE-to-UE BM procedure and the explicit UE-to-UE BM procedure, the first UE may perform either implicit or explicit UE-to-UE BM. For example, the first UE may initiate the explicit UE-to-UE BM procedure by periodically triggering L1-RSRP or L1-SINR reporting from the second UE. As another example, the first UE may request the second UE to assist the first UE's implicit UE-to-UE BM procedure by transmitting multiple CSI-RS resources with beam repetition. As yet another example, the first UE may switch between explicit and implicit BM types based at least in part on the second UE's mobility state. For example, when the second UE is in low mobility state, the first UE may select the explicit UE-to-UE BM procedure. When the second UE is in a high mobility state, the first UE may select the implicit UE-to-UE BM procedure. As described above, the second UE may indicate its mobility state (e.g., low mobility versus high mobility), which may assist in the first UE's selection of the type of UE-to-UE BM procedure.

Table 1, below, provides an example summary of BM type selection and BM actions of the first UE (UE1) and the second UE (UE2) given different capabilities of the first UE and a selected BM type of the first UE:

As indicated above, FIG. 8 is provided as an example. Other examples may differ from what is described with regard to FIG. 8. For example, the first UE or the second UE of FIG. 8 may additionally or alternatively perform any one or more actions described with regard to example 600 of FIG. 6, example 700 of FIG. 7, or example 900 of FIG. 9. As another example, while FIG. 8 is primarily described with regard to signaling to support explicit and implicit BM procedures, the signaling of FIG. 8 can also include capability signaling or mobility state information relating to a hybrid UE-to-UE BM procedure, as described in FIG. 9. Furthermore, any description of signaling relating to, or BM using, a type of UE-to-UE BM procedure can also encompass signaling relating to, or BM using, a hybrid UE-to-UE BM procedure as described in FIG. 9.

Figure 9:
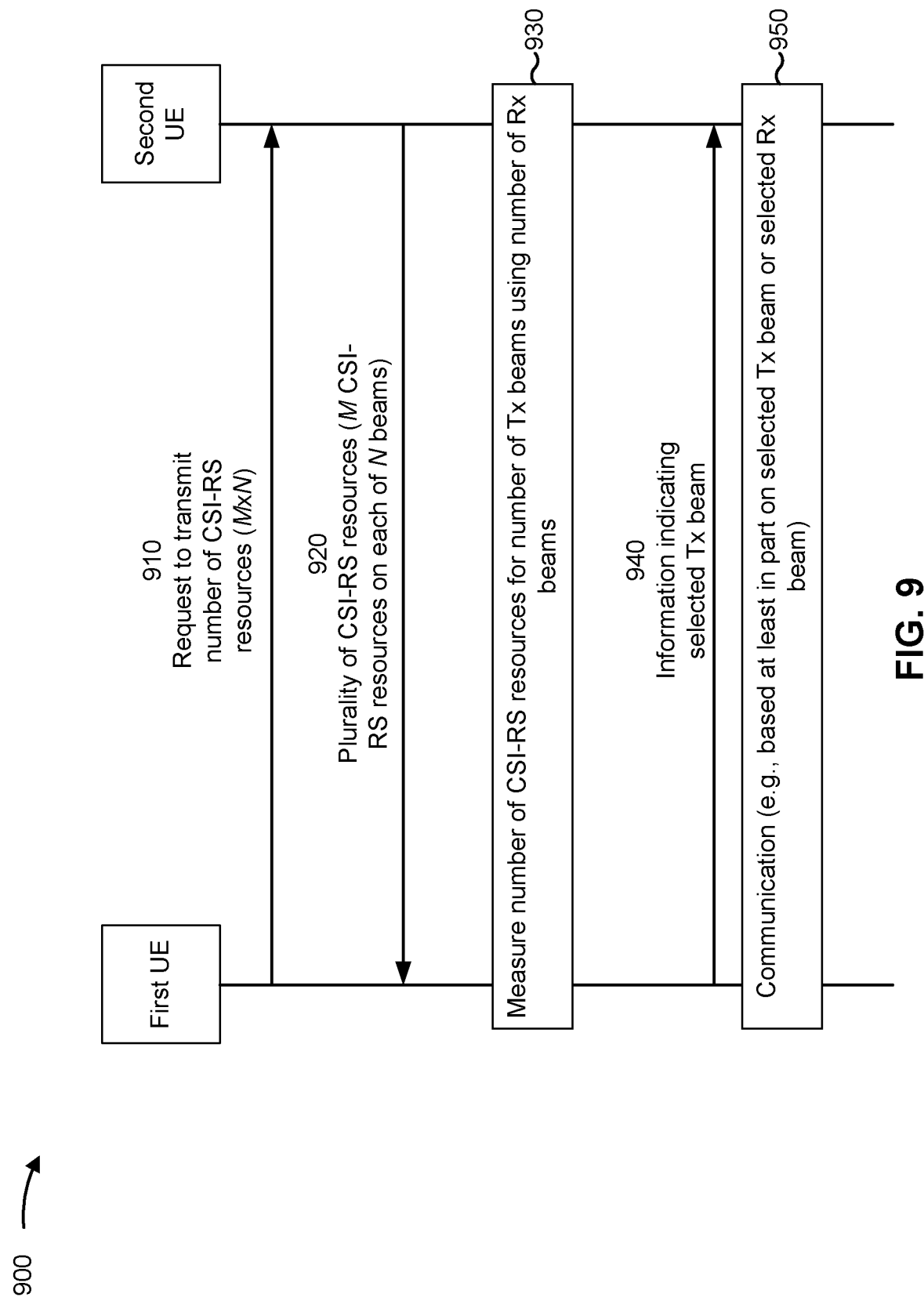
FIG. 9 is a diagram illustrating an example of a hybrid UE-to-UE BM procedure, in accordance with the present disclosure.

FIG. 9 is a diagram illustrating an example 900 of a hybrid UE-to-UE BM procedure, in accordance with the present disclosure. Example 900 includes a first UE (e.g., UE 120, UE 405, UE 505, UE 605, UE 610, UE 705, UE 710, the first UE of FIG. 8) and a second UE (e.g., UE 120, UE 405, UE 505, UE 605, UE 610, UE 705, UE 710, the second UE of FIG. 8).

As shown in FIG. 9, and by reference number 910, the first UE may transmit, and the second UE may receive, signaling including a request to transmit a number of CSI-RS resources. The request may include a first indication of a number of CSI-RS resources (e.g., a number of repetitions of a CSI-RS resource) to transmit per beam (M) and a second indication of a number of transmit beams (N). For example, the request may indicate to transmit M×N CSI-RS resources with M repetitions on each of N Tx beams.

As shown by reference number 920, the second UE may transmit a plurality of CSI-RS resources in accordance with the signaling. For example, the second UE may transmit the number of M CSI-RS resources (e.g., repetitions) per beam for each of the N beams. As an example, if M is 2 and N is 4, the second UE may transmit 8 total CSI-RS resources: 2 on a first beam, 2 on a second beam, 2 on a third beam, and 2 on a fourth beam. In some aspects, the UE may select the N beams. For example, the UE may select N Tx beams to sweep for the transmission of the CSI-RS resources.

As shown by reference number 930, the first UE may measure the number of CSI-RS resources (M) for the number of Tx beams (N) using a number of receive beams. The number of receive beams may include, for example, any

TABLE 1

| UE1 capability | UE1 Tx beam selection | UE1 Rx beam selection | UE2 behavior |
|---|---|---|---|
| Implicit only (for both Rx and Tx beam) | Based on beam correspondence | Based on CSI-RS measurement with Rx beam sweep | Transmit CSI-RSs with beam repetition according to UE1's request |
| Explicit only (for both Rx and Tx beam) | Based on BM reporting from UE2. UE1 transmits multiple CSI-RSs with Tx beam sweeping | Based on beam correspondence | Measure and report top K CSI-RS resources with fixed Rx beam |
| Both implicit and explicit (explicit selected) | Based on BM reporting from UE2. UE1 transmits multiple CSI-RSs with Tx beam sweeping | Based on beam correspondence | Measure and report top K CSI-RS resources with fixed Rx beam |
| Both implicit and explicit (implicit selected) | Based on beam correspondence | Based on CSI-RS measurement with Rx beam sweep | Transmit CSI-RSs with beam repetition according to UE1's request | number of receive beams between and including 1 to M×N receive beams. In some aspects, the first UE may select the number of receive beams. Additionally, or alternatively, the first UE may select particular receive beams to measure. For example, the first UE may determine beam parameters of a set of beams for measurement of the plurality of CSI-RS resources.

As shown by reference number 940, the first UE may transmit information (e.g., a third indication) indicating a selected Tx beam of the N Tx beams. For example, the first UE may select a Tx beam based at least in part on a measurement (e.g., a Tx beam with a strongest L1-RSRP, a Tx beam with a highest L1-SINR). As another example, the first UE may select a Tx beam based at least in part on a preferred Rx beam. For example, the first UE may select a Tx beam that is associated with a best measurement on a preferred Rx beam of the first UE. Thus, the first UE may select a selected Tx beam for the second UE based at least in part on a selected beam pair of the first UE. The information indicating the selected Tx beam may include, for example, information indicating a TCI state of the selected Tx beam, information indicating a CSI-RS resource of the selected Tx beam, or the like.

As shown by reference number 950, the first UE and the second UE may communicate. For example, the first UE and the second UE may communicate based at least in part on the selected Tx beam or the selected Rx beam. In some aspects, the first UE may receive, using the selected Rx beam, a communication transmitted by the second UE using the selected Tx beam. In some aspects, if the first UE supports beam correspondence, the first UE may transmit a communication using the selected Rx beam (e.g., beam parameters of the selected Rx beam, as described with regard to beam correspondence elsewhere herein). In some aspects, if the second UE supports beam correspondence, the second UE may receive a communication using the selected Tx beam (e.g., beam parameters of the selected Tx beam, as described with regard to beam correspondence elsewhere herein).

As indicated above, FIG. 9 is provided as an example. Other examples are described with regard to FIG. 9.

Figure 10:
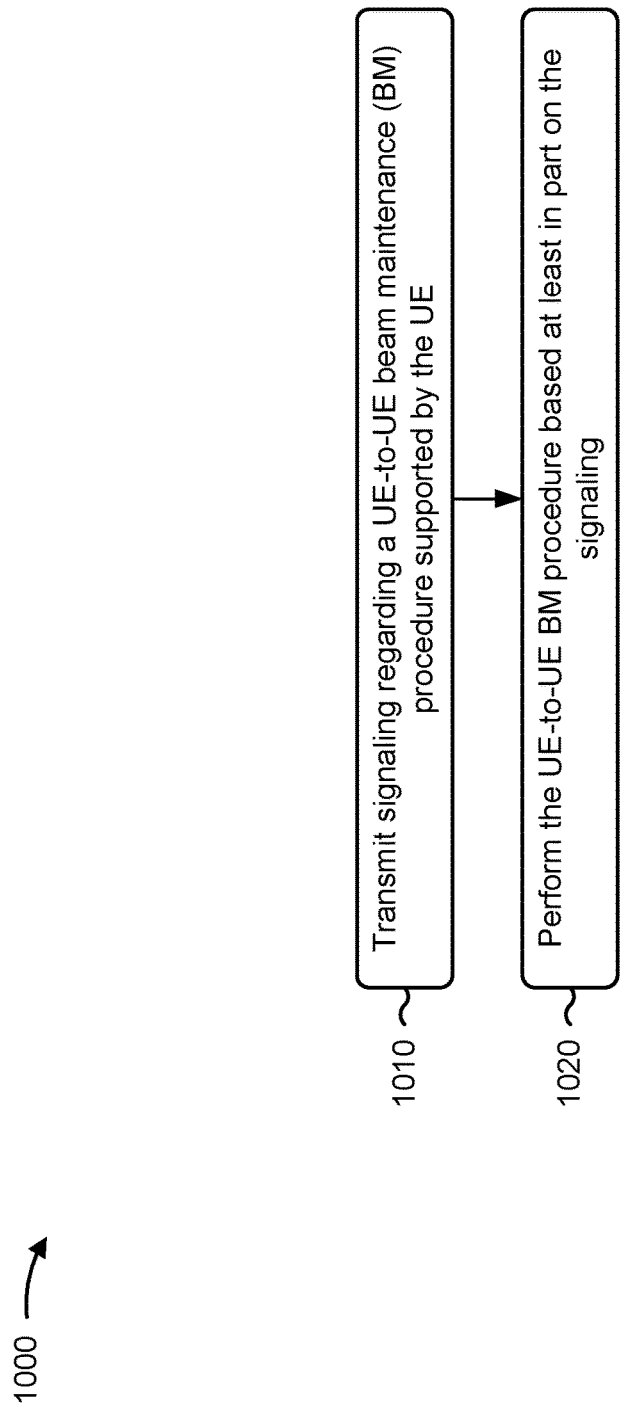
FIG. 10 is a diagram illustrating an example process performed, for example, by a UE, in accordance with the present disclosure.

FIG. 10 is a diagram illustrating an example process 1000 performed, for example, by a UE, in accordance with the present disclosure. Example process 1000 is an example where the UE (e.g., UE 120, UE 405, UE 505, UE 605, UE 610, UE 705, UE 710, the first UE of FIGS. 8 and/or 9) performs operations associated with UE-to-UE BM procedures.

As shown in FIG. 10, in some aspects, process 1000 may include transmitting signaling regarding a UE-to-UE BM procedure supported by the UE (block 1010). For example, the UE (e.g., using transmission component 1104 and/or communication manager 1106, depicted in FIG. 11) may transmit signaling regarding a UE-to-UE BM procedure supported by the UE, as described above. The signaling may include a CSI-RS transmission, a request for another UE to perform a CSI-RS transmission, capability signaling, information indicating a mobility state, or a configuration indicating a number of CSI-RS resources and/or a number of beams on which to transmit the number of CSI-RS resources, as described herein.

As further shown in FIG. 10, in some aspects, process 1000 may include performing the UE-to-UE BM procedure based at least in part on the signaling (block 1020). For example, the UE (e.g., using communication manager 1106, depicted in FIG. 11) may perform the UE-to-UE BM procedure based at least in part on the signaling, as described above. The UE-to-UE BM procedure may be an implicit UE-to-UE BM procedure, an explicit UE-to-UE BM procedure, or a hybrid UE-to-UE BM procedure, as described in connection with FIGS. 6, 7, and 9, respectively.

Process 1000 may include additional aspects, such as any single aspect or any combination of aspects described below and/or in connection with one or more other processes described elsewhere herein.

In a first aspect, the signaling regarding the UE-to-UE BM procedure comprises a request for another UE to transmit a plurality of CSI-RS resources using a single transmit beam.

In a second aspect, alone or in combination with the first aspect, the request is an aperiodic request.

In a third aspect, alone or in combination with one or more of the first and second aspects, the request is a periodic request.

In a fourth aspect, alone or in combination with one or more of the first through third aspects, the signaling regarding the UE-to-UE BM procedure comprises a plurality of CSI-RS resources corresponding to a plurality of transmit beams.

In a fifth aspect, alone or in combination with one or more of the first through fourth aspects, the signaling regarding the UE-to-UE BM procedure further comprises a request for information regarding measurements of one or more beams of the plurality of transmit beams.

In a sixth aspect, alone or in combination with one or more of the first through fifth aspects, the signaling regarding the UE-to-UE BM procedure further comprises information indicating a selected beam of the plurality of transmit beams based at least in part on the plurality of CSI-RS resources.

In a seventh aspect, alone or in combination with one or more of the first through sixth aspects, the signaling regarding the UE-to-UE BM procedure comprises capability information indicating one or more types of UE-to-UE BM procedures supported by the UE.

In an eighth aspect, alone or in combination with one or more of the first through seventh aspects, transmitting the signaling regarding the UE-to-UE BM procedure further comprises transmitting the signaling during or after unicast link establishment between the UE and another UE.

In a ninth aspect, alone or in combination with one or more of the first through eighth aspects, the UE-to-UE BM procedure is a first UE-to-UE BM procedure, and process 1000 includes switching to a second UE-to-UE BM procedure based at least in part on a first mobility state of the UE or a second mobility state of another UE, the other UE being associated with the UE-to-UE BM procedure.

In a tenth aspect, alone or in combination with one or more of the first through ninth aspects, the first UE-to-UE BM procedure is one of an implicit UE-to-UE BM procedure or an explicit UE-to-UE BM procedure, and the second UE-to-UE BM procedure is an other of the implicit UE-to-UE BM procedure or the explicit UE-to-UE BM procedure.

In an eleventh aspect, alone or in combination with one or more of the first through tenth aspects, process 1000 includes receiving information indicating the second mobility state.

In a twelfth aspect, alone or in combination with one or more of the first through eleventh aspects, the signaling regarding the UE-to-UE BM procedure comprises a first indication of a number of CSI-RS resources to transmit per beam, and a second indication of a number of beams for the UE-to-UE BM procedure.

In a thirteenth aspect, alone or in combination with one or more of the first through twelfth aspects, the signaling further comprises a third indication of a preferred beam, of the number of beams.

In a fourteenth aspect, alone or in combination with one or more of the first through thirteenth aspects, transmitting the signaling further comprises transmitting a request for a second UE to transmit a plurality of CSI-RS resources using a single transmit beam, wherein performing the UE-to-UE BM procedure further comprises measuring the plurality of CSI-RS resources using a plurality of receive beams, and communicating with the second UE using a selected receive beam, of the plurality of receive beams, based at least in part on measuring the plurality of CSI-RS resources.

In a fifteenth aspect, alone or in combination with one or more of the first through fourteenth aspects, communicating with the selected UE using the selected receive beam further comprises transmitting or receiving a communication using the selected receive beam.

In a sixteenth aspect, alone or in combination with one or more of the first through fifteenth aspects, transmitting the signaling further comprises transmitting a plurality of CSI-RS resources using a plurality of transmit beams, and performing the UE-to-UE BM procedure comprises receiving, from a second UE, information regarding measurements of one or more beams of the plurality of transmit beams, and selecting a beam for communication with the second UE based in part on the measurements of one or more beams of the plurality of the transmit beams.

In a seventeenth aspect, alone or in combination with one or more of the first through sixteenth aspects, the one or more beams comprise a top one or more beams of the plurality of transmit beams.

In an eighteenth aspect, alone or in combination with one or more of the first through seventeenth aspects, communicating with the second UE using the selected beam further comprises transmitting or receiving a communication using the selected beam.

In a nineteenth aspect, alone or in combination with one or more of the first through eighteenth aspects, process 1000 includes transmitting information indicating the selected beam to the second UE.

In a twentieth aspect, alone or in combination with one or more of the first through nineteenth aspects, the signaling regarding the UE-to-UE BM procedure comprises a first indication of a number of CSI-RS resources to transmit per beam, and a second indication of a number of transmit beams for the UE-to-UE BM procedure, and performing the UE-to-UE BM procedure further comprises measuring the number of CSI-RS resources for the number of transmit beams using a number of receive beams, transmitting a third indication of a selected beam, of the number of transmit beams, and communicating using the selected beam.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
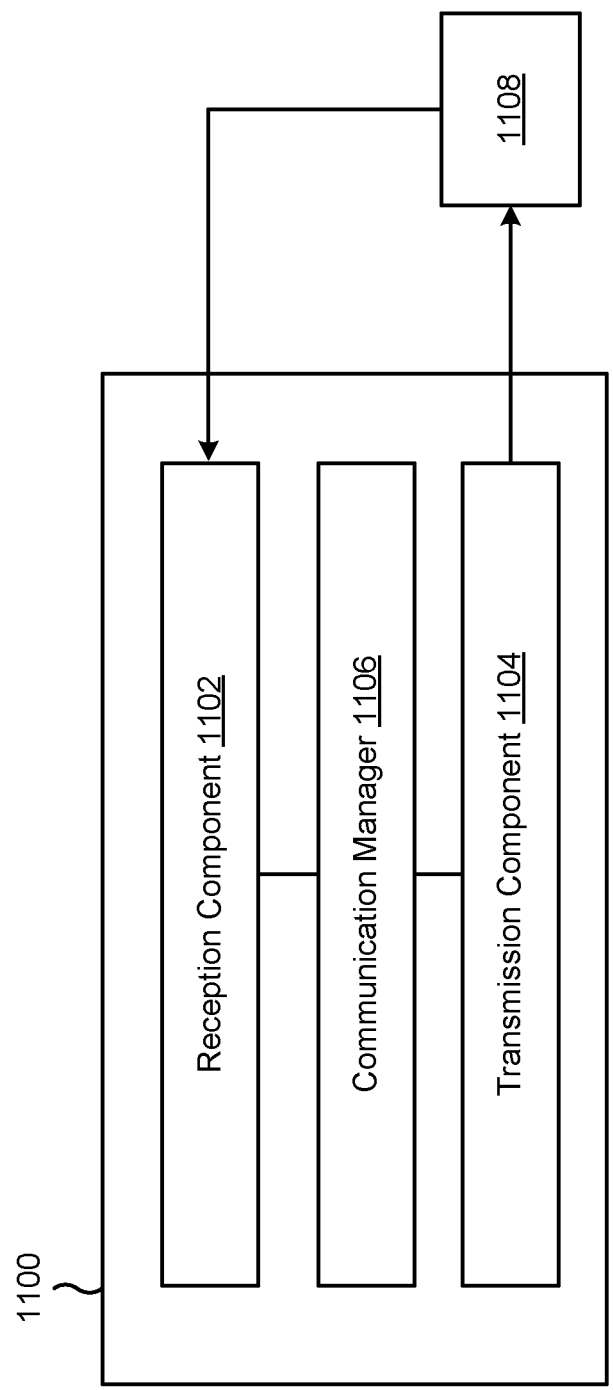
FIG. 11 is a diagram of an example apparatus for wireless communication, in accordance with the present disclosure.

FIG. 11 is a diagram of an example apparatus 1100 for wireless communication, in accordance with the present disclosure. The apparatus 1100 may be a UE, or a UE may include the apparatus 1100. In some aspects, the apparatus 1100 includes a reception component 1102, a transmission component 1104, and/or a communication manager 1106, which may be in communication with one another (for example, via one or more buses and/or one or more other components). In some aspects, the communication manager 1106 is the communication manager 140 described in connection with FIG. 1. As shown, the apparatus 1100 may communicate with another apparatus 1108, such as a UE or a network node (such as a CU, a DU, an RU, or a base station), using the reception component 1102 and the transmission component 1104.

In some aspects, the apparatus 1100 may be configured to perform one or more operations described herein in connection with FIGS. 4-9. Additionally, or alternatively, the apparatus 1100 may be configured to perform one or more processes described herein, such as process 1000 of FIG. 10, or a combination thereof. In some aspects, the apparatus 1100 and/or one or more components shown in FIG. 11 may include one or more components of the UE described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1108. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the UE described in connection with FIG. 2.

The transmission component 1104 may transmit communications, such as reference signals, control information, data communications, or a combination thereof, to the apparatus 1108. In some aspects, one or more other components of the apparatus 1100 may generate communications and may provide the generated communications to the transmission component 1104 for transmission to the apparatus 1108. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1108. In some aspects, the transmission component 1104 may include one or more antennas, a modem, a modulator, a transmit MIMO processor, a transmit processor, a controller/processor, a memory, or a combination thereof, of the UE described in connection with FIG. 2. In some aspects, the transmission component 1104 may be co-located with the reception component 1102 in a transceiver.

The communication manager 1106 may support operations of the reception component 1102 and/or the transmission component 1104. For example, the communication manager 1106 may receive information associated with configuring reception of communications by the reception component 1102 and/or transmission of communications by the transmission component 1104. Additionally, or alternatively, the communication manager 1106 may generate and/or provide control information to the reception component 1102 and/or the transmission component 1104 to control reception and/or transmission of communications.

The transmission component 1104 may transmit signaling regarding a UE-to-UE BM procedure supported by the UE. The communication manager 1106 may perform the UE-to-UE BM procedure based at least in part on the signaling.

The reception component 1102 may receive information indicating the second mobility state.

The transmission component 1104 may transmit information indicating the selected beam to the second UE.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a user equipment (UE), comprising: transmitting signaling regarding a UE-to-UE beam maintenance (BM) procedure supported by the UE; and performing the UE-to-UE BM procedure based at least in part on the signaling.

Aspect 2: The method of Aspect 1, wherein the signaling regarding the UE-to-UE BM procedure comprises a request for another UE to transmit a plurality of channel state information reference signal (CSI-RS) resources using a single transmit beam.

Aspect 3: The method of Aspect 2, wherein the request is an aperiodic request.

Aspect 4: The method of Aspect 2, wherein the request is a periodic request.

Aspect 5: The method of any of Aspects 1-4, wherein the signaling regarding the UE-to-UE BM procedure comprises a plurality of channel state information reference signal (CSI-RS) resources corresponding to a plurality of transmit beams.

Aspect 6: The method of Aspect 5, wherein the signaling regarding the UE-to-UE BM procedure further comprises a request for information regarding measurements of one or more beams of the plurality of transmit beams.

Aspect 7: The method of Aspect 5, wherein the signaling regarding the UE-to-UE BM procedure further comprises information indicating a selected beam of the plurality of transmit beams based at least in part on the plurality of CSI-RS resources.

Aspect 8: The method of any of Aspects 1-7, wherein the signaling regarding the UE-to-UE BM procedure comprises capability information indicating one or more types of UE-to-UE BM procedures supported by the UE.

Aspect 9: The method of Aspect 8, wherein transmitting the signaling regarding the UE-to-UE BM procedure further comprises transmitting the signaling during or after unicast link establishment between the UE and another UE.

Aspect 10: The method of any of Aspects 1-9, wherein the UE-to-UE BM procedure is a first UE-to-UE BM procedure, and wherein the method further comprises switching to a second UE-to-UE BM procedure based at least in part on a first mobility state of the UE or a second mobility state of another UE, the other UE being associated with the UE-to-UE BM procedure.

Aspect 11: The method of Aspect 10, wherein the first UE-to-UE BM procedure is one of an implicit UE-to-UE BM procedure or an explicit UE-to-UE BM procedure, and the second UE-to-UE BM procedure is an other of the implicit UE-to-UE BM procedure or the explicit UE-to-UE BM procedure.

Aspect 12: The method of Aspect 10, further comprising receiving information indicating the second mobility state.

Aspect 13: The method of any of Aspects 1-12, wherein the signaling regarding the UE-to-UE BM procedure comprises a first indication of a number of CSI-RS resources to transmit per beam, and a second indication of a number of beams for the UE-to-UE BM procedure.

Aspect 14: The method of Aspect 13, wherein the signaling further comprises a third indication of a preferred beam, of the number of beams.

Aspect 15: The method of any of Aspects 1-14, wherein transmitting the signaling further comprises transmitting a request for a second UE to transmit a plurality of channel state information reference signal (CSI-RS) resources using a single transmit beam, wherein performing the UE-to-UE BM procedure further comprises: measuring the plurality of CSI-RS resources using a plurality of receive beams; and communicating with the second UE using a selected receive beam, of the plurality of receive beams, based at least in part on measuring the plurality of CSI-RS resources.

Aspect 16: The method of Aspect 15, wherein communicating with the selected UE using the selected receive beam further comprises transmitting or receiving a communication using the selected receive beam.

Aspect 17: The method of any of Aspects 1-16, wherein transmitting the signaling further comprises transmitting a plurality of channel state information reference signal (CSI-RS) resources using a plurality of transmit beams, and wherein performing the UE-to-UE BM procedure comprises: receiving, from a second UE, information regarding measurements of one or more beams of the plurality of transmit beams; and selecting a beam for communication with the second UE based in part on the measurements of one or more beams of the plurality of the transmit beams.

Aspect 18: The method of Aspect 17, wherein the one or more beams comprise a top one or more beams of the plurality of transmit beams.

Aspect 19: The method of Aspect 17, wherein communicating with the second UE using the selected beam further comprises transmitting or receiving a communication using the selected beam.

Aspect 20: The method of Aspect 17, further comprising transmitting information indicating the selected beam to the second UE.

Aspect 21: The method of any of Aspects 1-20, wherein the signaling regarding the UE-to-UE BM procedure comprises a first indication of a number of CSI-RS resources to transmit per beam, and a second indication of a number of transmit beams for the UE-to-UE BM procedure, and wherein performing the UE-to-UE BM procedure further comprises: measuring the number of CSI-RS resources for the number of transmit beams using a number of receive beams; transmitting a third indication of a selected beam, of the number of transmit beams; and communicating using the selected beam.

Aspect 22: An apparatus for wireless communication at a device, comprising a processor; memory coupled with the processor; and instructions stored in the memory and executable by the processor to cause the apparatus to perform the method of one or more of Aspects 1-21.

Aspect 23: A device for wireless communication, comprising a memory and one or more processors coupled to the memory, the one or more processors configured to perform the method of one or more of Aspects 1-21.

Aspect 24: An apparatus for wireless communication, comprising at least one means for performing the method of one or more of Aspects 1-21.

Aspect 25: A non-transitory computer-readable medium storing code for wireless communication, the code comprising instructions executable by a processor to perform the method of one or more of Aspects 1-21.

Aspect 26: A non-transitory computer-readable medium storing a set of instructions for wireless communication, the set of instructions comprising one or more instructions that, when executed by one or more processors of a device, cause the device to perform the method of one or more of Aspects 1-21.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   one or more memories; and
   one or more processors, coupled to the one or more memories, configured to:
      transmit signaling regarding a UE-to-UE beam maintenance (BM) procedure supported by the UE, wherein the signaling regarding the UE-to-UE BM procedure comprises capability information indicating one or more types of UE-to-UE BM procedures supported by the UE, and wherein the one or more types of UE-to-UE BM procedures comprise an explicit UE-to-UE BM procedure and an implicit UE-to-UE BM procedure; and
      perform the UE-to-UE BM procedure based at least in part on the signaling.

2. The UE of claim 1, wherein the signaling regarding the UE-to-UE BM procedure comprises a request for an other UE to transmit a plurality of channel state information reference signal (CSI-RS) resources using a single transmit beam.

3. The UE of claim 2, wherein the request is an aperiodic request.

4. The UE of claim 1, wherein the signaling regarding the UE-to-UE BM procedure comprises a plurality of channel state information reference signal (CSI-RS) resources corresponding to a plurality of transmit beams.

5. The UE of claim 4, wherein the signaling regarding the UE-to-UE BM procedure further comprises a request for information regarding measurements of one or more beams of the plurality of transmit beams.

6. The UE of claim 4, wherein the signaling regarding the UE-to-UE BM procedure further comprises information indicating a selected beam of the plurality of transmit beams based at least in part on the plurality of CSI-RS resources.

7. The UE of claim 1, wherein the one or more processors are configured to:
   activate or deactivate at least one of the one or more types of UE-to-UE BM procedures.

8. The UE of claim 1, wherein the UE-to-UE BM procedure is a first UE-to-UE BM procedure, and wherein the one or more processors are configured to switch to a second UE-to-UE BM procedure based at least in part on a first mobility state of the UE or a second mobility state of an other UE, the other UE being associated with the UE-to-UE BM procedure.

9. The UE of claim 8, wherein the first UE-to-UE BM procedure is one of the implicit UE-to-UE BM procedure or the explicit UE-to-UE BM procedure, and the second UE-to-UE BM procedure is an other of the implicit UE-to-UE BM procedure or the explicit UE-to-UE BM procedure.

10. The UE of claim 1, wherein the signaling regarding the UE-to-UE BM procedure comprises a first indication of a number of CSI-RS resources to transmit per beam, and a second indication of a number of beams for the UE-to-UE BM procedure.

11. The UE of claim 1, wherein transmitting the signaling further comprises transmitting a request for a second UE to transmit a plurality of channel state information reference signal (CSI-RS) resources using a single transmit beam, wherein the one or more processors, to perform the UE-to-UE BM procedure, are configured to:
   measure the plurality of CSI-RS resources using a plurality of receive beams; and
   communicate with the second UE using a selected receive beam, of the plurality of receive beams, based at least in part on measuring the plurality of CSI-RS resources.

12. The UE of claim 1, wherein the one or more processors, to transmit the signaling, are configured to transmit a plurality of channel state information reference signal (CSI-RS) resources using a plurality of transmit beams, and wherein the one or more processors, to perform the UE-to-UE BM procedure, are configured to:
   receive, from a second UE, information regarding measurements of one or more beams of the plurality of transmit beams; and
   select a beam for communication with the second UE based in part on the measurements of the one or more beams of the plurality of the transmit beams.

13. The UE of claim 12, wherein the one or more processors, to communicate with the second UE using the selected beam, are configured to transmit or receive a communication using the selected beam.

14. The UE of claim 12, wherein the one or more processors are further configured to transmit information indicating the selected beam to the second UE.

15. The UE of claim 1, wherein the signaling regarding the UE-to-UE BM procedure comprises a first indication of a number of CSI-RS resources to transmit per beam, and a second indication of a number of transmit beams for the UE-to-UE BM procedure, and wherein the one or more processors, to perform the UE-to-UE BM procedure, are configured to:
   measure the number of CSI-RS resources for the number of transmit beams using a number of receive beams;
   transmit a third indication of a selected beam, of the number of transmit beams; and
   communicate using the selected beam.

16. A method of wireless communication performed by a user equipment (UE), comprising:
   transmitting signaling regarding a UE-to-UE beam maintenance (BM) procedure supported by the UE, wherein the signaling regarding the UE-to-UE BM procedure comprises capability information indicating one or more types of UE-to-UE BM procedures supported by the UE, and wherein the one or more types of UE-to-UE BM procedures comprise an explicit UE-to-UE BM procedure and an implicit UE-to-UE BM procedure; and
   performing the UE-to-UE BM procedure based at least in part on the signaling.

17. The method of claim 16, wherein the signaling regarding the UE-to-UE BM procedure comprises a request for an other UE to transmit a plurality of channel state information reference signal (CSI-RS) resources using a single transmit beam.

18. The method of claim 16, wherein the signaling regarding the UE-to-UE BM procedure comprises a plurality of channel state information reference signal (CSI-RS) resources corresponding to a plurality of transmit beams.

19. A non-transitory computer-readable medium storing a set of instructions for wireless communication, the set of instructions comprising:
   one or more instructions that, when executed by one or more processors of a user equipment (UE), cause the UE to:
      transmit signaling regarding a UE-to-UE beam maintenance (BM) procedure supported by the UE, wherein the signaling regarding the UE-to-UE BM procedure comprises capability information indicating one or more types of UE-to-UE BM procedures supported by the UE, and wherein the one or more types of UE-to-UE BM procedures comprise an explicit UE-to-UE BM procedure and an implicit UE-to-UE BM procedure; and
      perform the UE-to-UE BM procedure based at least in part on the signaling.

20. The non-transitory computer-readable medium of claim 19, wherein the signaling regarding the UE-to-UE BM procedure comprises a request for an other UE to transmit a plurality of channel state information reference signal (CSI-RS) resources using a single transmit beam.

* * * * *